(12) United States Patent
Kress et al.

(10) Patent No.: US 10,091,830 B2
(45) Date of Patent: Oct. 2, 2018

(54) HUB DEVICE

(71) Applicant: T-Mobile USA, Inc., Bellevue, WA (US)

(72) Inventors: Darren J. Kress, Bothell, WA (US); Ahmad Arash Obaidi, Bellevue, WA (US); Eric W. Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/135,081

(22) Filed: Apr. 21, 2016

(65) Prior Publication Data

US 2017/0164417 A1 Jun. 8, 2017

Related U.S. Application Data

(60) Provisional application No. 62/263,379, filed on Dec. 4, 2015.

(51) Int. Cl.
*H04W 76/14* (2018.01)
*H04W 4/70* (2018.01)
(Continued)

(52) U.S. Cl.
CPC .......... *H04W 76/14* (2018.02); *H04B 1/0003* (2013.01); *H04W 4/005* (2013.01);
(Continued)

(58) Field of Classification Search
CPC ... H04W 76/023; H04W 88/06; H04W 48/16; H04W 48/18; H04W 88/08; H04W 12/02;
(Continued)

(56) References Cited

U.S. PATENT DOCUMENTS 7,319,715 B1 1/2008 Souissi et al.
8,566,947 B1 10/2013 Sankruthi
(Continued)

FOREIGN PATENT DOCUMENTS

KR 1020130125385 11/2013
WO WO2015/172803 A1 11/2015

OTHER PUBLICATIONS

Audet, F., "The Use of the SIPS URI Scheme in the Session Initiation Protocol (SIP)", Network Working Group, equest for Comments 5630, Standards Track, Oct. 2009, pp. 1-21 and 51.

(Continued)

*Primary Examiner* — Thai Vu
(74) *Attorney, Agent, or Firm* — Lee & Hayes, PLLC (57) ABSTRACT

Systems and processes that may be implemented to maintain an up-to-date communication bridge between an Internet-of-Things (IoT) physical network and a cellular telecom network are described herein. The systems and processes may eliminate an incompatibility of a hub device with physical layer technologies (PLTs), e.g. 4G or 5G technology, or various IoT protocols. The hub device may include one or more FPGAs that are configured to facilitate communication using one or more PLTs and/or IoT protocols. The hub device may receive information corresponding to different PLTs and/or IoT protocols, e.g. that the hub device is currently incompatible with, and may reprogram one or more of the FPGAs based on this information to eliminate such incompatibilities.

20 Claims, 5 Drawing Sheets

(51) Int. Cl.
| | |
|---|---|
| H04B 1/00 | (2006.01) |
| H04W 4/00 | (2018.01) |
| H04W 12/02 | (2009.01) |
| H04W 12/04 | (2009.01) |
| H04W 48/16 | (2009.01) |
| H04W 76/02 | (2009.01) |

(52) U.S. Cl.
CPC ............. *H04W 4/70* (2018.02); *H04W 12/02* (2013.01); *H04W 12/04* (2013.01); *H04W 48/16* (2013.01); *H04W 76/023* (2013.01)

(58) Field of Classification Search
CPC ..... H04W 12/04; H04W 12/06; H04W 4/005; H04W 4/008; H04W 88/04; H04W 88/10; H04W 92/10; H04W 4/70; H04W 76/14; H04B 1/0003; H04L 41/082; H04L 67/104
See application file for complete search history.

(56) References Cited

U.S. PATENT DOCUMENTS

| | | | |
|---|---|---|---|
| 9,125,027 | B2 | 9/2015 | Koenig et al. |
| 9,606,817 | B1* | 3/2017 | Efstathopoulos ....... G06F 9/455 |
| 2002/0163895 | A1 | 11/2002 | Haller et al. |
| 2003/0035397 | A1 | 2/2003 | Haller et al. |
| 2004/0249915 | A1* | 12/2004 | Russell ................. G01S 5/0252 709/223 |
| 2005/0213516 | A1 | 9/2005 | Ramirez, II et al. |
| 2005/0213590 | A1 | 9/2005 | Hauenstein et al. |
| 2007/0293197 | A1 | 12/2007 | Ekberg et al. |
| 2008/0220757 | A1 | 9/2008 | Zeller et al. |
| 2009/0006503 | A1 | 1/2009 | Bernardi et al. |
| 2009/0319613 | A1 | 12/2009 | Hjelm et al. |
| 2011/0320520 | A1 | 12/2011 | Jain |
| 2014/0085502 | A1 | 3/2014 | Lin et al. |
| 2014/0328241 | A1 | 11/2014 | Subramanian et al. |
| 2014/0355446 | A1* | 12/2014 | Altman ............. H04W 28/0289 370/235 |
| 2015/0135283 | A1 | 5/2015 | Tofighbakhsh |
| 2015/0281939 | A1 | 10/2015 | Li et al. |
| 2015/0365217 | A1 | 12/2015 | Scholten et al. |
| 2016/0037569 | A1 | 2/2016 | Kim et al. |
| 2016/0323161 | A1 | 11/2016 | Cuervo Laffaye et al. |

OTHER PUBLICATIONS

Bappalige, S.P., "An Introduction to Apache Hadoop", Opensource.com, retrieved on Dec. 20, 2016 from <<https://opensource.com/life/14/8/intro-apache-hadoop-big-data>>, 16 pages.

"Fault Tolerant Computer System", Wikipedia, retrieved Jan. 25, 2017 from <<https://en.wikipedia.org/wiki/Fault-tolerant_computer_system>>, 5 pages.

Hamlin, K., "A Study on SETI@home Distributed Network", Department of Computer Science, Wichita State University, retrieved Dec. 20, 2016 from <<http://www.cs.wichita.edu/~chang/lecture/cs843/project/paper/kh-stei.pdf >>, 11 pages.

"Hot Spare", Wikipedia, retrieved Jan. 25, 2017 from <<https://en.wikipedia.org/wiki/Hot_spare>>, 3 pages.

Jennings, et al., "Managing Client-Initiated Connections in the Session Initiation Protocol (SIP)", Network Working Group, Request for Comments 5626, Standards Track, Oct. 20019, pp. 1-4, 6-18, 21-25, and 44-45.

Kallenberg, C., "Setup for Failure: Defeating Secure Boot", The MITRE Corporation, Mar. 6, 2014, retrieved from <<https://infocon.org/cons/SyScan/SyScan%202014%20Singapore/SyScan%202014%20presentations/SyScan2014_CoreyKallenberg_SetupforFailureDefeatingSecureBoot_WP.pdf>>, 4 pages.

"MyTAM—Intercede", retrieved Jan. 25, 2017 from <<https://www.intercede.com/products-mytam>>, 9 pages.

The PCT Search Report and Written Opinion dated Feb. 2, 2017 for PCT application No. PCT/US2016/063371, 11 pages.

Proudler, G., "What's in a Trusted Computing Platform?", InformIt, Aug. 23, 2002, retrieved from <<http://www.informit.com/articles/printerfriendly/28804>>, 6 pages.

Regenscheid, A., "Roots of Trust in Mobile Devices", ISPAB, Feb. 2012, retrieved from <<http://csrc.nist.gov/groups/SMA/ispab/documents/minutes/2012-02/feb1_mobility-roots-of-trust_regenscheid.pdf>>, 5 pages.

"Security Enhancements in Android 4.3", Android Open Source Project, retrieved Jan. 25, 2017, from <<https://source.android.com/security/enhancements/enhancements43.html>>, 1 page.

"Trust Zone—Arm Developer", retrieved Jan. 25, 2017 from <<https://developer.arm.com/technologies/trustzone>>, 7 pages.

"Trusted Execution Environment", Wikipedia, retrieved Jan. 25, 2017 from <<https://en.wikipedia.org/wiki/Trusted_execution_environment>>. 5 pages.

"Trusted Execution Technology", Wikipedia, retrieved Jan. 25, 2017 from <<https://en.wikipedia.org/wiki/Trusted_Execution_Technology>>>, 5 pages.

"Trusted Platform Module", Wikipedia, retrieved Jan. 25, 2017 from <<https://en.wikipedia.org/wiki/Trusted_Platform_Module>>, 10 pages.

"Cisco NFV Solution: Enabling Rapid Service Innovation in the Era of Virtualization", White Paper, SISCO Oct. 2014, Retrieved from https://www.cisco.com/c/dam/globalshared/assets/pdf/sp04/nfv-solution.pdf, 9 pgs.

The PCT Search Report and Written Opinion dated Jan. 11, 2018 for PCT application No. PCT/US17/54199, 14 pages.

The PCT Search Report and Written Opinion dated Jan. 20, 2018 for PCT application No. PCT/US17/54200, 12 pages.

* cited by examiner

HUB DEVICE

CROSS-REFERENCE TO RELATED APPLICATIONS

The present application claims the benefit of U.S. Provisional Patent Application No. 62/263,379 filed Dec. 4, 2015, which is incorporated herein by reference in their entirety as if fully set forth herein.

BACKGROUND

Telecommunications network architectures are continuously updated as increasingly powerful physical layer technologies (PLTs) are implemented to increase data transmission rates and ranges. Modern routing devices are typically configured with dedicated PLT hardware that is incapable of being reconfigured, e.g. to operate with different PLTs. Accordingly, modern routing devices that are deployed for use with already implemented PLTs may become outdated and requiring of replacement equipment upon implementation of new PLTs. Moreover, as the realm of the Internet of Things (IoT) expands, internet connectivity is becoming ubiquitous for an increasing array of physical objects embedded with software and sensors configured to collect field data from physical world and provide that field data to user's and/or third party service providers via the internet. The technologies and protocols which enable IoT communication are also expanding and, naturally, modern routing devices are currently incompatible with yet to be implemented and/or developed IoT protocols.

Accordingly, it may be tedious or impracticable to remain up to date in terms of connectivity abilities using modern routing devices which are statically configured to operate with predetermined telecommunications PLTs and IoT protocols.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes various systems and processes that may be implemented to maintain an updated communication-bridge between an Internet-of-Things (IoT) physical object network and a cellular telecommunications network. In particular, the systems and processes may implement a hub device for bridging communications between an IoT physical object network and a telecommunications network, wherein the hub device is capable of being dynamically reconfigured to communicate over newly implemented technologies and/or protocols. For example, as part of implementing a new physical layer technology (PLT) of a telecommunications network, a telecommunications carrier may push updated PLT protocol data to the hub device to enable the hub device to communicate via the new PLT. Once the updated PLT protocol data is received, the hub device may be updated with new functionality which enables it to establish a connection with the new PLT despite having been incompatible with the new PLT prior to having received the updated PLT protocol data. The hub device may further receive updated IoT protocol data which enables it, upon being reconfigured, to establish connections utilizing new IoT communications protocols. These systems and processes, which are described further herein, can alleviate the need to continuously replace physical router devices, or hardware components thereof, in response to newly implemented PLT and/or IoT communication protocols. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results.

Figure 1:
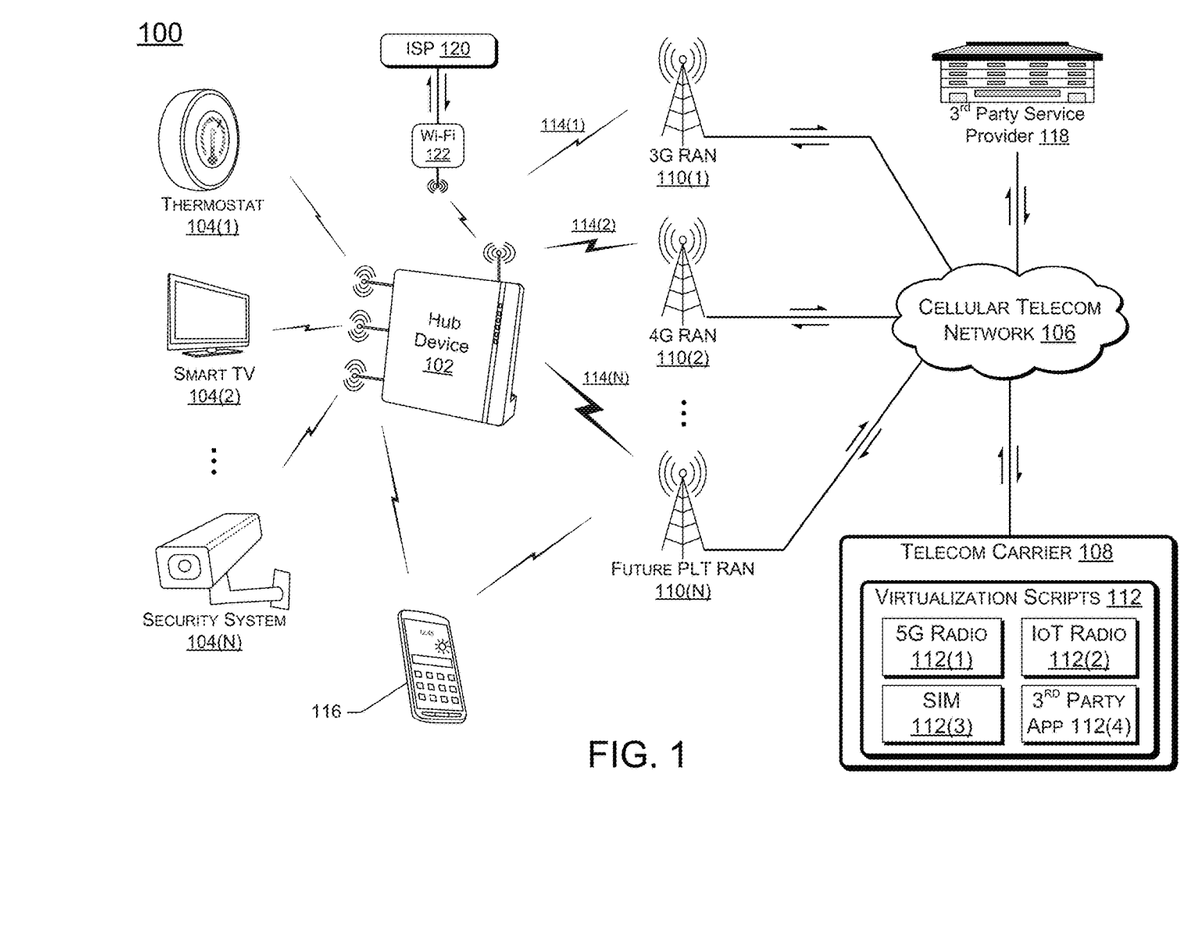
FIG. 1 illustrates an overview of an exemplary system for maintaining an updated communication-bridge between an Internet-of-Things (IoT) physical object network and a cellular telecommunications (telecom) network, in accordance with various implementations of the disclosure.

FIG. 1 illustrates an overview of an exemplary system/network 100 for utilizing a hub device 102 to maintain an updated communication-bridge between a network of Internet-of-Things (IoT) physical objects 104 and a cellular telecommunications network 106 of a telecom carrier 108. The telecom network 106 may be any sort of telecom network and may comprise a core network and multiple access networks. Such a core network may include a number of network components providing connectivity between the cells of the telecom network 106, between cells of the telecom network 106 and those of other telecom networks, and between cells of the telecom network 106 and devices of other networks. The core network may support packet-switched communications, circuit-switched communications, or both. Further, the core network may be a System Architecture Evolution (SAE) core network or a UMTS core network, or may include network components from both. Also, the core network may include an Internet Protocol (IP) Multimedia subsystem (IMS) layer for supporting packet-switched communications. Further, the core network may include a server, as well as other devices. Such a server may be an OTA server which provisions the hub device 102 and other devices with the virtualization scripts 112. The cellular telecommunications network 106 may typically include one or more radio access networks (RANs) 110 which may be based on a variety of PLTs. For example, RAN 110(1) may be configured based on a 3G PLT while RAN 110(2) may be configured based on a 4G PLT. The RANs 110 may be connected to the cellular telecom network 106 through one or more physical links interconnecting network nodes.

In some embodiments, the hub device 102 is deployed into the system/network 100 being configured to establish communication links with one or more PLTs but may lack compatibility with one or more PLTs which has yet to be fully developed and/or implemented. For example, the hub device 102 may be deployed at a time when the 4G RAN 110(2) is utilizing the most state of the art implemented PLT. Accordingly, when deployed the hub device may be configured to be compatible with the 4G RAN 110(2) and optionally one or more legacy PLTs, e.g. the 3G RAN 110(1), such that wireless connections 114(1) and 114(2) may be established upon deployment but not wireless connection 114(N). Then at some future point in time and based at least partially on a scheduled implementation of future PLT RANs 110(N), e.g. a plurality of 5G RANs which are intended to surpass service capabilities of the current RANs, telecommunication carrier 108 may transmit updated PLT protocol data to the hub device 102 to achieve expanded functionality thereon. For example, a 5G Radio virtualization script 112(1) may be transmitted to the hub device 102 via the cellular telecommunications network 106 including the 4G RAN 110(2) and implemented by the hub device to establish wireless connection 114(N) with the future PLT RAN 110(N). In this way, the hub device 102 may receive via a first PLT, e.g. 4G RAN 110(2), updated protocol data corresponding to a second PLT with which the hub device 102 is incompatible, e.g. 5G PLT RAN 110(N). Then, using this updated protocol data, the hub device 102 may be reconfigured on the fly to remove the incompatibility with the 5G PLT RAN.

While the foregoing description refers to 5G PLT technology as being an exemplary future PLT this should not be construed as limiting. Rather, other types of PLTs may be within the scope of a future PLT whether currently existing or subsequently developed. For example, technologies subsequently developed to replace 5G PLT RANs may be considered future PLTs. Moreover, currently existing PLTs which a device is incompatible with may also be a future PLT in the sense that compatibility with that PLT comes after the device is deployed. For example, a hub device affixed to a mobile vehicle may receive updated PLT protocol data corresponding to legacy PLTs as the vehicle travels into geographic regions supporting such legacy PLTs and use this updated protocol data to gain compatibility with the legacy protocols.

In some embodiments, the hub device 102 is configured to identify and select an optimal one of the RANs 110 based on one or more factors such as signal strength and/or realized data transmission rates. For example, the hub device 102 may receive updated PLT protocol data such as the 5G radio virtualization script 112(1) prior to the cellular telecommunication network 106 being fully updated with all future PLT RANs, e.g. fully implementing a PLT may require tens of thousands of new RANs 110(N). Therefore, in an area which has yet to be updated with a new RAN 110(N) one or more existing technologies, e.g. 110(2) or 110(1), may remain optimal in certain locations. In some embodiments, the hub device 102 is configured to periodically reassess which RAN PLT is optimal based on the one or more factors.

In some embodiments, the hub device 102 may also be deployed into the system/network 100 being configured to establish communication links with one or more IoT physical devices 104. For example, the hub device 102 may communicate with an IoT thermostat 104(1) which is configured to transmit field data, e.g. temperature readings taken from a physical environment, to one or both of a user device 116 or a third party service provider 118. Other exemplary IoT physical devices include, but are not limited to, an IoT smart TV 104(2) and an IoT security system 104(N). Because the various IoT physical devices 104 possess differing core functionalities, different IoT protocols may be used across the devices 104. For example, the IoT thermostat 104(1) may operate on battery power (as opposed to being hardwired) and, as a result, may be configured to communicate via an IoT protocol which requires minimal power. In contrast, the IoT smart TV 104(2) may be unconstrained in terms of power consumption while requiring a high rate of data transfer in order to stream media content. Accordingly, the IoT smart TV 104(2) may be configured to communicate via a different IoT protocol than the IoT thermostat 104(1). The wide and ever increasing variety of applications for IoT devices has already led to the development of numerous IoT protocols and will undoubtedly lead to more. In some embodiments, the hub device 102 is dynamically re-configurable to support differing IoT protocols. For example, the hub device 102 may include one or more software defined radios (SDRs) which may be programmed, based on updated IoT protocol data, e.g. IoT virtualization script 112(2), received via the cellular telecom network 106.

Other types of virtualization scripts 112 may also be incorporated in various implementations. For example, in various implementations, any hardware, firmware, or software which may be added to a computing device, such as hub device 102, may be virtualized. For example, both a 5G radio 112(1) and a SIM card 112(3) may be hardware components that may be added to a computing device. To virtualize a given component of hardware or firmware, a circuit diagram may be automatically or manually created for that component, and a virtualization script 112, such as a VHDL script, may be automatically or manually created for the circuit diagram. Virtualization script(s) 112 may then be provided (in compiled versions or otherwise) to the telecommunication network 106, to a server, or to both to enable OTA provisioning of computing devices such as the hub device 102, removing the need for physical addition of the componentry to those computing devices.

In some embodiments, the hub device 102 may be configured to connect to an internet service provider (ISP) 120 that provides internet service through one or more physical connections. For example, ISP 120 may provide internet service to a local area network through a coaxial cable or an optical fiber. In some embodiments, the physical connection may terminate at the hub device 102, e.g. a coaxial cable may screw into the hub device 102 which may also serve as a cable internet modem to service a local area network (LAN). In some embodiments, the physical connection may terminate at a modem external to the hub device 102 such as, for example, Wi-Fi modem device 122 which is configured to create a wireless local area network (WLAN) and the hub device 102 includes a wireless transceiver configured to communicate via the Wi-Fi modem device 122.

In some embodiments, the hub device 102 may be configured to selectively transmit data between a particular IoT physical device, e.g. IoT security system 104(N), and a third party service provider 118. For example, security system 104(N) may be configured to collect sensitive field data from a predefined area, e.g. a residential home, and the hub device 102 may act as an intermediary to secure communications between the IoT security system 104(N) and the 3rd party service provider 118.

It should be appreciated that the exemplary telecommunication system/network 100 of FIG. 1 is intended to depict a simplified representation of a telecommunication network that can employ any mixture of telecommunication technologies which are commonly utilized in a real-world, heterogeneous telecommunication network including but not limited to 2G, 3G, 4G, and 5G access technologies and/or any combination of common wireless broadband communication technologies, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, or WiFi® technology. These diverse communication technologies are neither depicted nor described within the context of the telecommunication system/network 100 of FIG. 1, for the sake of brevity.

Figure 2:
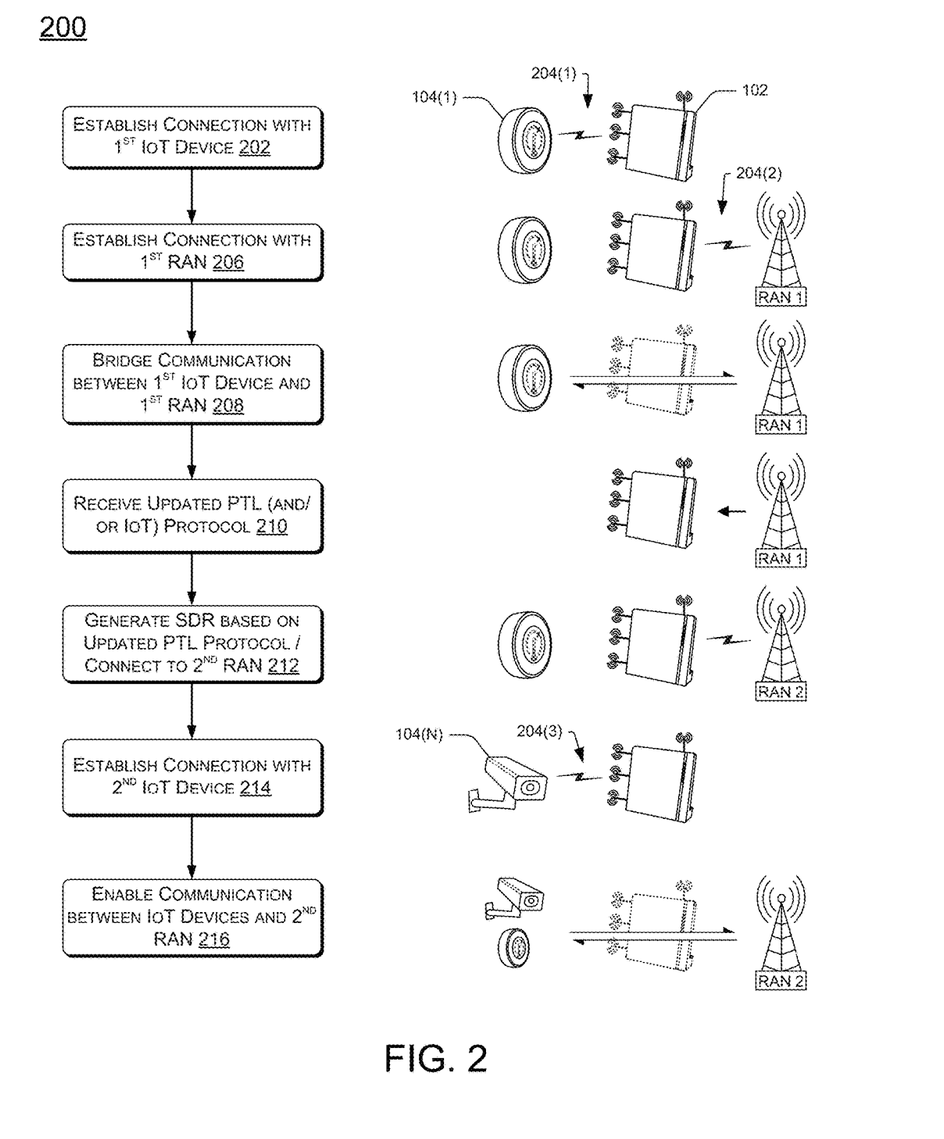
FIG. 2 is a pictorial flow diagram that shows an illustrative process of eliminating an incompatibility with one or more physical layer technologies (PLTs) and/or IoT protocols of a hub device configured to bridge communications between an IoT physical object network and a cellular telecom network.

FIG. 2 is a pictorial flow diagram that shows an illustrative process of eliminating an incompatibility with one or more physical layer technologies and/or IoT protocols of a hub device that is configured to bridge communications between an IoT physical object network and a cellular telecom network. The order in which operations are described is not intended to be construed as a limitation, and any number of the described blocks can be combined in any order and/or in parallel to implement the process. Other processes described throughout this disclosure, in addition to process 200, shall be interpreted accordingly.

At block 202, a hub device 102 may establish a first connection 204(1) with a first IoT physical object 104(1) of an IoT physical object network. The IoT physical object network may include a single IoT physical object or multiple IoT physical objects which may be configured with similar or differing IoT communication protocols. For example, the first IoT physical object 104(1) may be configured to communicate via a particular IoT protocol designed to service applications which require relatively infrequent data exchanges at low rates of data transfer over a limited range such as, for example, a home or building. Such an IoT protocol may include, but is not limited to, the ZigBee 3.0 IoT protocol which is based on the IEEE802.15.4 protocol.

In some embodiments, the first connection 204(1) is achieved utilizing a software defined radio (SDR). In particular, the hub device 102 be configured to perform RF signal processing on one or more processors as opposed to special purpose hardware. For example, the hub device 102 may include one or more antennas which are capable of receiving and transmitting RF signals at one or more particular frequencies or bands of frequencies. These antennas may be connected to one or more SDRs which may be selectively programmed or re-configured to communicate via various IoT protocols (or PLT protocols for that matter). Accordingly, because the hub device 102 is capable of being dynamically reconfigured to communicate via various communication protocols, existing infrastructural constraints which are not application specific may be given little or no weight in selecting an appropriate IoT protocol for any particular application. One major existing infrastructural constraint is the current pervasiveness of protocols within intended use environments which biases many developers toward selecting WiFi™ protocols in the design of IoT physical devices despite the availability of more design appropriate IoT protocols. For example, there are currently numerous WiFi™ enabled thermostats on the market today largely because of the large number of homes which are outfitted with WiFi™ routers to provide wireless internet service. However, the WiFi™ protocol consumes more power than some other IoT protocols, which is fine file and media transfers by devices which are frequently recharged; however, for other IoT applications, e.g. where high data transfer rates are not required but where low power consumption is, designers would likely forgo WiFi™ in favor of other protocols if those protocols could be easily added to existing infrastructure. Systems and methods disclosed herein provide a dynamically modifiable networking infrastructure and substantially eliminate the need for developers to consider infrastructural constraints in selecting an IoT protocol for a physical device. Rather, application specific considerations such as, for example, range, data requirements, security and power demands, and battery life may take precedence.

At block 206, the hub device 102 may establish a second connection 204(2) with a first radio access network (RAN 1), of a cellular telecom network, which is based on a first PLT. For example, the hub device 102 may connect to a 4G RAN of the cellular telecom network. In some embodiments, the second connection 204(2) is established with an SDR that is programmed according to the first PLT, e.g. an SDR that is configured based on 4G PLT protocol(s). For example, the hub device 102 may include one or more antennas capable of operating in a variety of different bands assigned for cellular use and one or more SDRs may be coupled to the antenna(s). The SDR(s) may then be, at block 206, configured to receive and transmit data based on the first PLT.

At block 208, the hub device 102 may bridge communications between the first IoT physical object 104(1) and the cellular telecom network, and therefore the internet in general, through the connection with RAN 1. For example, the first IoT physical object 104(1) may be a home thermostat or a wearable technology utilizing an ultra-low power and low data transmission rate IoT protocol, e.g. SIGFOX, and the hub device 102 may be configured to receive data from the first IoT physical object 104(1) based on the first IoT protocol and then transmit that data to the RAN 1 using the first PLT protocol, and vice versa.

At block 210, the hub device 102 may receive updated PLT protocol data from RAN 1. For example, the hub device 102 may receive, via the SDR that is programmed according to the first PLT, data that corresponds to the processing and/or generating signals in accordance with a second PLT which may be based on the same or different frequency bands as the first PLT. At block 212, the hub device 102 may generate a new SDR that is programmed according to the second PLT, e.g. a 5G based PLT protocol(s). In some implementations, the new SDR is generated by flashing one or more field programmable gate arrays (FPGAs) to create specific electrical circuitry according to the second PLT. Moreover, in some implementations, the hub device 102 is incompatible with the second PLT prior to receiving the updated PLT protocol data and generating the new SDR based thereon. For example, although the hub device 102 may be dynamically reconfigurable, e.g. compatibilities with various technologies may be added or removed, the specific electrical circuitry defined by the updated PLT protocol data would not exist on the hub device 102 prior to being flashed onto the FPGA or otherwise replicated by one or more processor(s). Once the hub device 102 becomes compatible with the second PLT, the hub device 102 may connect to a second RAN (RAN 2). Upon connecting to RAN 2, the hub device 102 may bridge communications between the first IoT physical object and telecom network using the second PLT via RAN 2.

In some implementations, at block 210 or 212, the hub device 102 also receives updated IoT protocol data that corresponds to at least a second IoT protocol that the hub device 102 is currently incompatible with. Using the updated IoT protocol data, the hub device 102 may be dynamically reconfigured for compatibility with the second IoT protocol. For example, the hub device 102 may generate a new SDR that is programmed according to the second IoT protocol, e.g. a LoRaWAN based IoT protocol. Then, at block 214, a connection 204(3) may be established with a second IoT physical object, e.g. security system 104(N), by the hub device 102.

At block 216, the hub device 102 may bridge communications between the second IoT physical object 104(N) and the cellular telecom network, and therefore the internet in general, through the connection with RAN 2 even though the hub device 102 supported neither of the second PLT protocol nor the second IoT protocol when originally deployed. In some implementations, a configuration manager dashboard is provided to enable a user of the hub device 102 to select which PLT and/or IoT protocols to for the hub device 102 to support. For example, a user of the hub device 102 may wish to add the second IoT physical object, e.g. the security system 104(N), to the physical object network but may be unable to establish the connection due to the hub device being incompatible with the second IoT protocol. Moreover, due to this incompatibility the hub device may not even be able to "see," e.g. by scanning for the presence of, the second IoT physical object. Therefore, in some implementations, a user may specify through the configuration manager dashboard for updated IoT protocol data that corresponds at least to the second IoT protocol to be transmitted to the hub device to achieve compatibility with the second IoT protocol and, ultimately, the second IoT device. For example, the configuration manager dashboard may be operable by way of a user device application, e.g. a smartphone app, or more generically as a web portal application accessible from any device capable of accessing the internet.

In some implementations, the configuration manager dashboard includes or has access to a directory of IoT physical objects and corresponding IoT protocols. For example, a user may purchase a new IoT physical device which uses a new IoT protocol that the hub device is incompatible with at the time of the purchase but also reconfigurable for compatibility, e.g. by generating one or more new SDRs to establish connections using the new IoT protocol. When the user wishes to wirelessly connect the new IoT physical device to the hub device, the user may identify the new IoT physical device within the configuration manager dashboard. This may then cause updated IoT protocol data to be transmitted to the hub device 102 that corresponds to new IoT physical device.

In some implementations, the updated protocol data includes a variety of IoT protocols without regard to whether the IoT protocols are specified as being present in the physical object network. For example, the hub device may periodically receive data corresponding to any new IoT protocols which some IoT devices are utilizing or may utilize in the future. In some implementations, the hub device 102 may be configured to dynamically reconfigure itself for capability with one or more of the variety of IoT protocols during a "scan" for IoT physical objects to add to the physical object network. For example, rather than requiring a user to specify any IoT protocols to add to the compatibilities of the hub device, the hub device may dynamically cycle through these IoT protocols to scan for IoT devices in a "pairing mode," e.g. by generating SDRs for one or more particular ones of the variety of IoT protocols.

Figure 3:
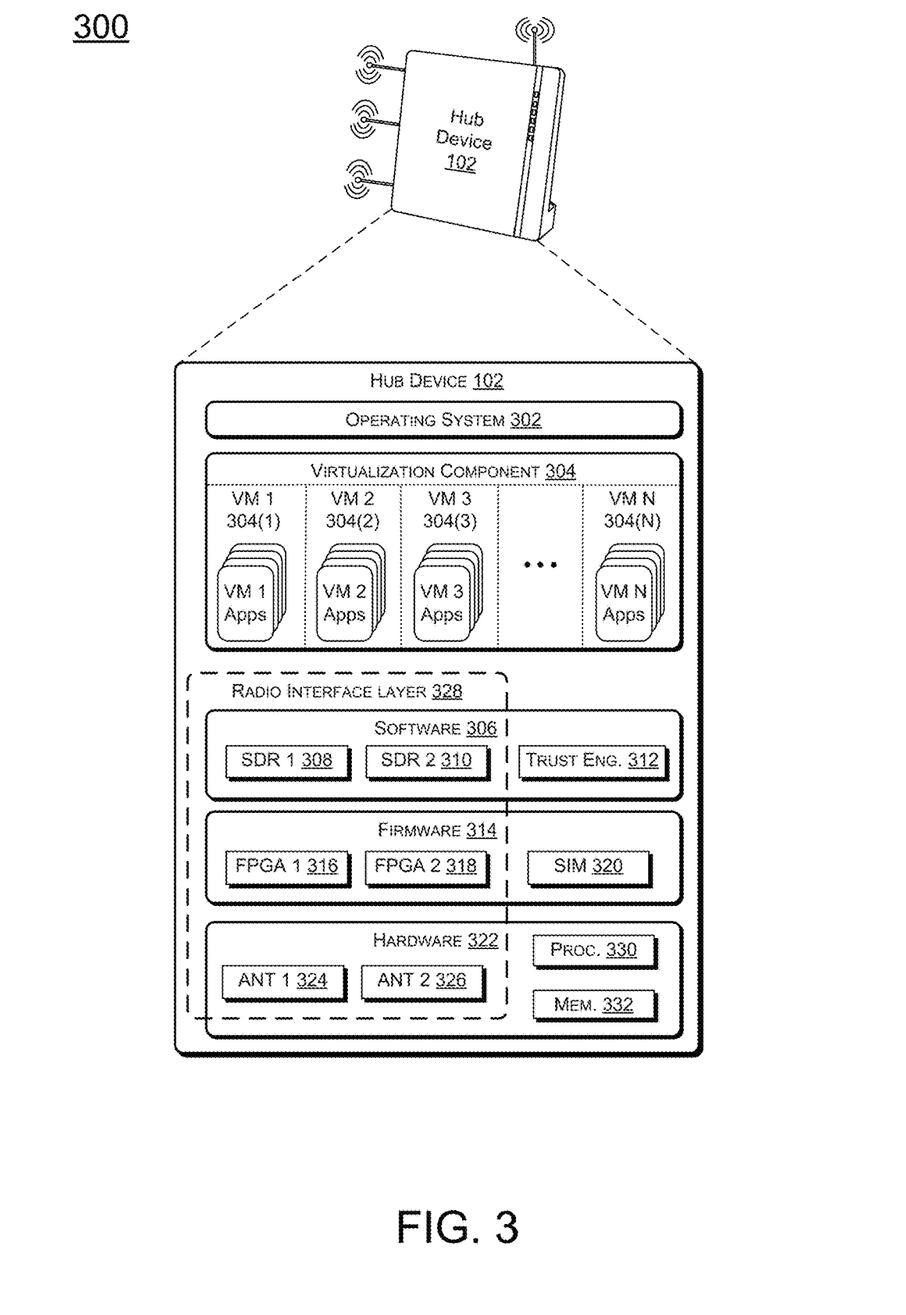
FIG. 3 is an example hub device hardware platform employed in maintaining an updated communication bridge between an IoT physical object network and a cellular telecom network, in accordance with embodiments of the disclosure.

FIG. 3 is an example hub device hardware platform employed in maintaining an updated communication bridge between an IoT physical object network and a cellular telecom network. Various embodiments of the hub device 102 may be provisioned with an operating system 302 and a virtualization component 304 that operates one or more virtual machines and/or virtual containers 304(1)-304(N). Various embodiments of the hub device 102 may also be provisioned with various components of software 306, firmware 314, and/or hardware 322 some or all of which may correspond to a radio interface layer 328.

The operating system 302 may be any sort of operating system and may enable the operation of one or more of the virtualization component 304, application(s) of the software 306, or components of the firmware 314 or hardware 322. The OS 120 may also include any device driver(s) which serve as APIs for configuring firmware components, e.g. FPGAs 316 or 318, based on updated PLT and/or IoT protocol data and for utilizing the FPGAs for communications with RANs 110.

In some embodiments, the virtualization component 304 may be operable to securely implement one or more virtual machines or containers each of which may run one or more corresponding applications. For example, the virtualization component 304 may securely implement a first virtual machine 304(1) that emulates a dedicated computer system running the corresponding applications. In some embodiments, the corresponding applications may be third party applications that correspond to third party services and/or particular IoT physical devices. For example, a third party home security service provider may provide one or more applications which correspond to security system 104(N). Due to the sensitive nature of field data that the security system 104(N) will collect during normal operation, some embodiments of the hub device 102 are configured to virtually isolate applications and corresponding field data within individual virtual machines or containers 304. In a configuration in which virtual machine 1 (VM 1) is dedicated to the security system 104(N), third party applications corresponding to the security system 104(N) may be securely run within VM 1 such that these applications and any field data collected by the security system 104(N) is virtually isolated from any other applications and/or field data collected from any other IoT physical devices 104. For example, field data collected by thermostat 104(1) is virtually isolated from field data collected by security system 104(N). Accordingly, various levels of security may be created and maintained on an individual IoT device level. Moreover, particular IoT devices for which field data is relatively insensitive in nature may operate with lesser security than other IoT devices without affecting the security levels of the other IoT devices. For example, in the event that security is breached with regard to the smart TV 104(2) (the field data of which may be limited to fairly insensitive data such as television show preferences) the field data of the security system 104(N) may remain secure.

In some embodiments, the virtualization component 304, and/or individual virtual machines or containers thereof, may encrypt field data received from one or more IoT devices 104 prior to transmitting the field data to a corresponding third party service provider. For example, an application provided by the third party home security service provider may be operated on virtual machine 304(1) which may encrypt the field data prior to any component of a radio interface layer 328 transmitting the data to the home security service provider. In some embodiments, the hub device or virtualization component may be configured to initiate a registration of individual IoT physical devices, e.g. security system 104(N), with a corresponding third party service provider, e.g. home security service provider. Initiation of the registration may cause a dedicated virtual machine or container to be created on the virtualization component 304. Moreover, in some implementations, the third party service provider may respond to the registration by providing the virtualization component or the dedicated virtual machine or container with a cryptographic key usable to encrypt field data prior to transmission through the radio interface layer 328. Accordingly, field data collected from an individual IoT device may be isolated within a dedicated virtual machine and encrypted, e.g. with an asymmetric key the corresponding key of which is never transmitted to the hub device 102.

In some implementations, the software 306 includes a trust engine 312 for managing access to various components of the hub device 102. For example, the trust engine 312 may generate and/or manage one or more cryptographic keys by relaying the keys to various components of the hub device 102 and or various third parties which may receive data transmitted through the hub device 102. In some implementations, the trust engine 312 may cause field data to be encrypted immediately upon initial receipt at the radio interface layer 328. For example, the trust engine 312 may monitor individual communications received from individual IoT devices 104 and may immediately encrypt such field data. The trust engine 312 may provide decryption means, e.g. an asymmetric key, to individual virtual machines or third party service providers.

In some embodiments, a radio interface layer 328 may comprise one or more SDRs 308 and 310, one or more FPGAs 316 & 318, one or more antennas 324 & 326, or any combination thereof Radio interface layer 328 may enable dynamic configuration of and/or communication between the SDRs FPGAs and/or the antennas in order to completely emulate hardware functionality needed for communication with or by IoT devices and/or wireless communication radios, e.g. RANs. Accordingly, rather than physically modifying the hub device 102 to add the hardware—often an expensive and time consuming exercise that slows the adoption of new technologies and/or locks consumers into old technologies due to infrastructural constraints—such hardware (e.g. a 5G radio, a sim card, or a ZigBee radio) may be described in one or more virtualization scripts 112, such as Very High Speed Integrated Circuit (VHSIC) Hardware Description Language (VHDL) scripts, which describes the circuitry of corresponding hardware in programming language. Such virtualization scripts 112 (in compiled versions or otherwise) may be provided OTA to the hub device 102 through the telecom network 106 and may be applied to portions of the FPGAs and/or SDRs to create hardware equivalents on the radio interface layer 328.

The radio interface layer 328 may be an application programming interface which enables components of the operating system 302, the virtualization component 304, and/or various virtual machines, e.g. 304(1), and applications thereof, to communicate with the SDRs, FPGAs, and/or antennas. The radio interface layer 328 may comprise software of the SDRs or FPGAs, software of the OS 302, software of the virtualization component 304, separate software, or some combination thereof.

In some embodiments, the hub device 102 may include at least one IoT side antenna and at least one RAN side antenna. For example, in some embodiments, antenna 324 may serve as an IoT side antenna and may be configured for communication with one or more IoT devices. For example, antenna 324 may be designed for optimal communication efficiency at one or both of 2.4 GHz or 5 GHz due to the wide array of currently available IoT devices utilizing these frequencies. In some embodiments, one or both of SDR 1 308 and/or FPGA 1 316 receives RF signals from antenna 324 processes the received RF signals to communicate using various IoT protocols. In some embodiments, one or both of the SDR 1 308 and FPGA 316 may be overwritten to iteratively toggle between IoT protocols. For example, the hub device 102 may be periodically reconfigured, e.g. based on a predetermined schedule or a triggering event, to switch IoT compatibilities of the radio interface layer 328. In some embodiments, FPGA 316 makes up SDR 1 308 in part or in whole such that reconfiguring SDR 1 308 to communicate via a different IoT protocol includes reprogramming FPGA 1 316. In some embodiments, antenna 326 may serve as a RAN side antenna and may be configured for communication with telecom network 106 via one or more RANs. For example, antenna 326 may be designed for optimal communication efficiency at one or more of 900/1800/1900/2100 MHz due to these frequencies making up a majority or all of the currently designated cellular bands.

The FPGAs may be any sort of FPGAs and may include reprogrammable circuitry (gates, wiring, etc.) which may be activated and deactivated. An equivalent of a given piece of hardware may be created in the FPGAs by activating parts of this reprogrammable circuitry. Thus, through such activation, the hub device 102 may have the equivalents of hardware without requiring the actual addition of that hardware.

Further, the hub device 102 may include other hardware components such as a processor 330, system memory 332, as well as other non-illustrated components such as removable storage, non-removable storage, and/or radios/modems. In some implementations, such processor(s) are central processing unit(s) (CPU(s)), graphics processing unit(s) (GPU(s)), or both CPU(s) and GPU(s), or any other sort of processing unit(s).

In various implementations, system memory is volatile (such as RAM), non-volatile (such as ROM, flash memory, etc.) or some combination of the two. Additional data storage devices (removable and/or non-removable) may include, for example, magnetic disks, optical disks, or tape.

Non-transitory computer-readable media may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the hub device 102. Any such non-transitory computer-readable media may be part of the hub device 102.

In some implementations, the radios and/or modems include any sort of radio, modems, or combinations thereof known in the art. Such radios and/or modems may be in addition to the radios and/or modems created in parts of the FPGAs, as described above. For example, such additional radios and/or modems may include a radio transceiver that performs the function of transmitting and receiving radio frequency communications via an antenna. The radios and/or modems may facilitate wireless connectivity between the hub device 102 and various devices or one or more networks. In addition, the radios and/or modems may also include a wireless communication transceiver and a near field antenna for communicating over unlicensed wireless IP networks, such as local wireless data networks and personal area networks (e.g., Bluetooth or near field communication (NFC) networks). Further, the radios and/or modems may include wired communication components, such as an Ethernet port, that connect the hub device 102 in a wired fashion to devices of one or more networks.

Figure 4:
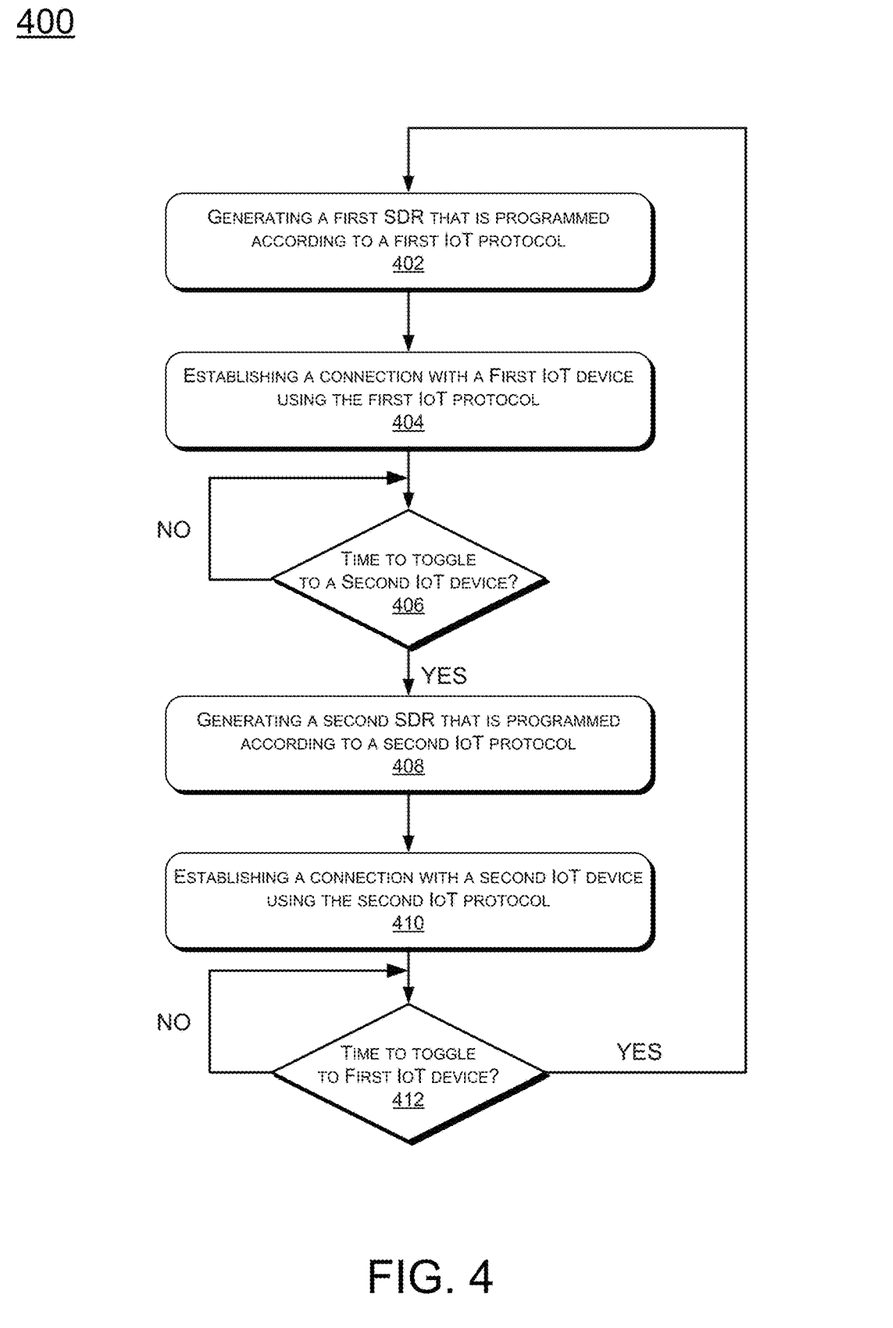
FIG. 4 is a flow chart of an example process for iteratively toggling between two or more IoT devices operating based on two or more IoT protocols, in accordance with embodiments of the disclosure.

FIG. 4 is a flow chart of an example process for iteratively toggling between two or more IoT devices operating based on two or more IoT protocols, in accordance with embodiments of the disclosure.

At block 402, the hub device 102 may generate a first SDR that is programmed according to a first IoT protocol. For example, the hub device 102 may flash FPGA 1 316 to create specific electrical circuitry according to the first IoT protocol. Once the hub device 102 has generated the first SDR it may have gained a new ability to communicate via devices which utilize the first IoT protocol. At block 404, the hub device 102 may establish a connection with a first IoT device using the first IoT protocol.

Due to design constraints, the hub device 102 may include a finite number of FPGAs and, therefore, may only possess compatibility with a finite number of IoT protocols at any given instance in time. Systems and processes disclosed herein enable the hub device 102 to support a greater number of IoT protocols over a period of time than can supported at an instance in time. For example, suppose the hub device 102 includes only FPGAs 316 and 318. Further suppose that FPGA 318 is dedicated to supporting RAN side communications and that the hub device 102 must periodically collect information from at least two IoT devices that use different IoT protocols. By re-flashing FPGA 1 316 (which was used to generate the first SDR at block 402) with new circuitry to generate the second SDR at block 408, the hub device 102 may use a single FPGA to support multiple IoT protocols.

More specifically, at decision block 406, a determination may be made as to whether to toggle connections to a second IoT device. If no, then the hub device 102 may simply remain connected to the first IoT device and return to decision block 406 at a later time. If yes, then the process may proceed to block 408 at which the hub device 102 may generate a second SDR that is programmed according to a second IoT protocol. For example, the hub device 102 may re-flash FPGA 1 316 to create specific electrical circuitry according to the second IoT protocol. Once the hub device 102 has generated the second SDR it may have gained a new ability to communicate via devices which utilize the second IoT protocol. At block 410, the hub device 102 may establish a connection with the second IoT device using the second IoT protocol. Then, at decision block 412, a determination may be made as to whether to toggle connections back to the first IoT device. If no, then the hub device 102 may simply remain connected to the second IoT device and return to decision block 412 at a later time. If yes, then the process may proceed to back to block 402 (or to a later block if a third, fourth, etc IoT protocol must be supported) at which the hub device 102 may re-generate the first SDR that is programmed according to the first IoT protocol.

Figure 5:
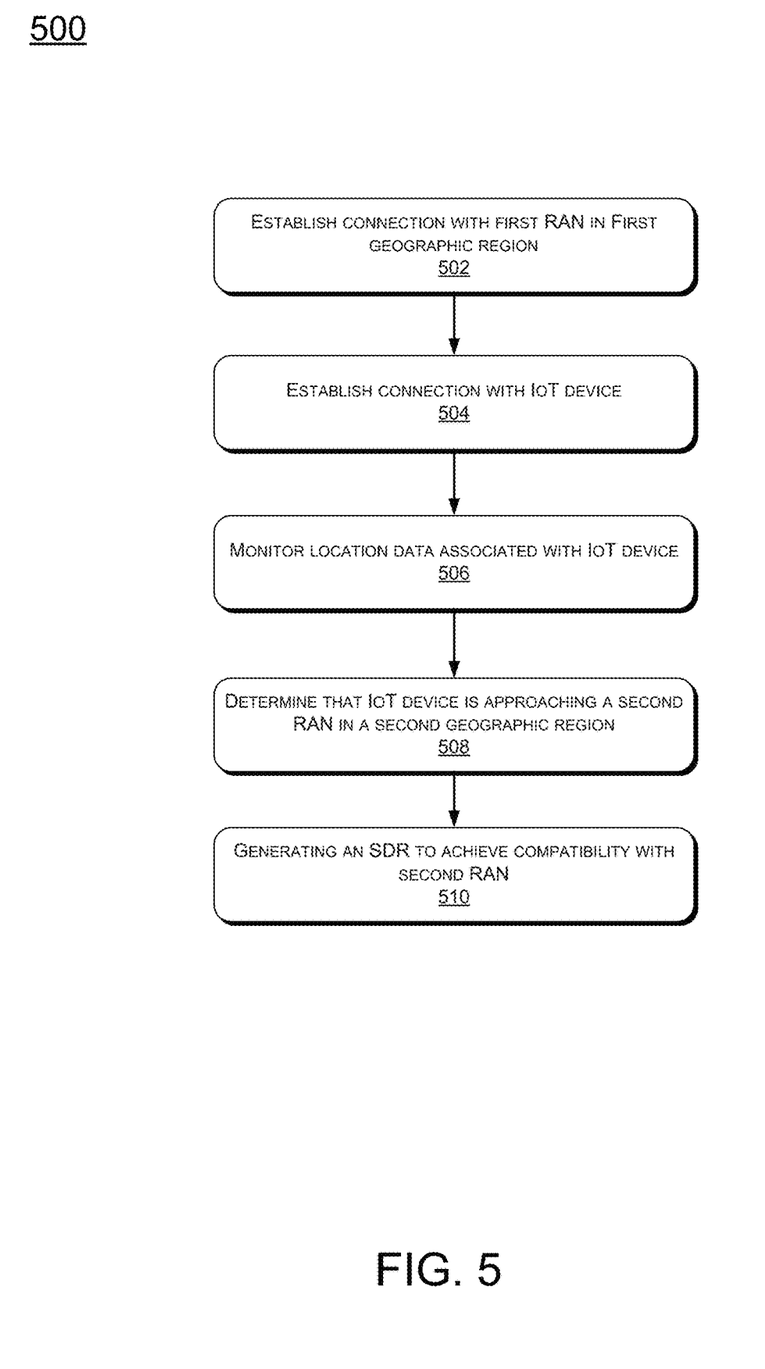
FIG. 5 is a flow chart of an example process for gaining compatibilities with one or more PLTs while approaching geographic regions which utilize radio access networks based on those PLTs, in accordance with embodiments of the disclosure.

FIG. 5 is a flow chart of an example process for gaining compatibilities with one or more PLTs while approaching geographic regions which utilize radio access networks based on those PLTs, in accordance with embodiments of the disclosure.

At block 502, a hub device may establish a connection with a first RAN in a first geographic region. For example, the first geographic region may include a relatively state of the art 4G RAN network and the hub device may establish a connection with one or more individual RANs within this region as the hub device travels through the region. At block 504, the hub device may establish a connection with an IoT device configured to collect field data to be transmitted back to a remote entity. For example, the hub device may be affixed to a mobile vehicle and the hub device may be configured to collect field data associated with a refrigeration temperature of a produce transport trailer or a weight of a liquid fuel trailer, e.g. to ensure that fuel cargo is not removed without authorization during the travel and topped off with water as is a known problem in some regions of the globe.

At block 506, the hub device may monitor location data associated with the IoT device. For example, if the IoT device is a weight sensor on the fuel transport trailer then the location of the IoT device may be monitored and known to correspond to the location of the vehicle transporting the cargo. At block 508, a determination may be made, based on the location data monitored at block 506, that the IoT device is approaching a second geographic region which uses a different RAN PLT than the first region. For example, the hub device may be approaching a boundary between a region with 4G RANs and a region with 3G RANs with which the hub device is currently incompatible with. Then, at block 510, the hub device may generate a new SDR in order to achieve compatibility with the RAN PLT used in the region which the hub device is about to enter. For example, an SDR may be generated that creates a 3G radio to enable continued communication with the remote entity as the hub device travels through various regions that use different RAN PLTs.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A hub device for maintaining an updated communication-bridge between an Internet-of-Things (IoT) physical object network and a cellular telecommunication network, the hub device comprising:
    one or more non-transitory tangible computer readable media comprising a radio interface layer including a plurality of software defined radios (SDRs), the radio interface layer configured to:
        establish a first wireless connection with a first IoT physical object, of the IoT physical object network, utilizing a first SDR, of the plurality of SDRs, that is programmed according to a first IoT protocol;
        establish a second wireless connection with the cellular telecommunication network utilizing a second SDR, of the plurality of SDRs, that is programmed according to a first physical layer technology (PLT) of the cellular telecommunication network;
    the one or more non-transitory tangible computer readable media storing instructions for updating one or more communication protocols of the radio interface layer, the instructions executable by one or more processors to perform operations comprising:

receiving, via the second SDR that is programmed according to the first PLT, updated PLT protocol data that corresponds to a second PLT of the cellular telecommunication network;

generating, based on the updated PLT protocol data, a third SDR on the radio interface layer, the third SDR being programmed according to the second PLT of the cellular telecommunication network, wherein subsequent to the generating the third SDR based on the updated PLT protocol data received via the first PLT, causing the radio interface layer to establish a third wireless connection with the second PLT utilizing the third SDR;

generating, from the first SDR, a fourth SDR that is programmed according to a second IoT protocol that corresponds to a second IoT physical object;

causing the radio interface layer to establish a fourth wireless connection with the second IoT physical object utilizing the fourth SDR;

re-generating, from the fourth SDR, the first SDR that is programmed according to the first IoT protocol; and causing the radio interface layer to re-establish the first wireless connection with the first IoT physical object utilizing the first SDR.

2. The hub device of claim 1, wherein the generating the third SDR on the radio interface layer includes flashing at least one field programmable gate array (FPGA), and wherein the radio interface layer is incompatible with the second PLT prior to the flashing the at least one FPGA.

3. The hub device of claim 1, wherein the operations further comprise:

transmitting field data, received from the second IoT physical object via the fourth SDR, to a third party service provider that is associated with the second IoT physical object.

4. The hub device of claim 3, wherein the one or more non-transitory tangible computer readable media further comprise a virtualization component configured to:

operate a first virtual machine executing a first IoT application corresponding to the first IoT physical object; and operate a second virtual machine executing a second IoT application corresponding to the second IoT physical object, wherein the second virtual machine encrypts the field data, received from the second IoT physical object, prior to the transmitting the field data to the third party service provider.

5. The hub device of claim 4, wherein the virtualization component is further configured to:

initiate a registration of the second IoT physical object with the third party service provider;

based at least in part on the registration, receive a cryptographic key from the third party service provider; and provide the cryptographic key to the second virtual machine, wherein the second virtual machine encrypts the field data with the cryptographic key.

6. The hub device of claim 1, wherein the one or more non-transitory tangible computer readable media further comprise a virtualization component configured to:

execute a first IoT application within at least one of a first container or a first virtual machine, wherein the first IoT application encrypts first field data received from the first IoT physical object prior to the first field data being transmitted to the cellular telecommunication network; and execute a second IoT application within at least one of a second container or a second virtual machine, wherein the second IoT application encrypts second field data received from a second IoT physical object prior to the second field data being transmitted to the cellular telecommunication network.

7. The hub device of claim 6, wherein the first IoT application is virtually isolated from the second field data received from the second IoT physical object, and wherein the second IoT application is virtually isolated from the first field data received from the first IoT physical object.

8. The hub device of claim 1, wherein the re-generating the first SDR from the fourth SDR is performed according to a predetermined schedule for iteratively toggling between the first wireless connection with the first IoT physical object and the fourth wireless connection with the second IoT physical object.

9. A method of maintaining an updated communication-bridge between an Internet-of-Things (IoT) physical object network and a plurality of cellular telecommunication radio access networks (RANs), the method comprising:

establishing a first communication link with a first IoT device that is configured to communicate based on a first IoT protocol;

executing a first IoT application associated with the first IoT device within a first virtual machine, wherein the first IoT application encrypts first field data received from the first IoT device to the first field data being transmitted to a first RAN;

establishing, by a first software defined radio (SDR) configured to communicate via a first physical layer technology (PLT), a second communication link with the first RAN that corresponds to the first PLT;

transmitting to the first RAN, via the second communication link, the first field data that is received from the first IoT device via the first communication link;

receiving, via the first RAN that corresponds to the first PLT, updated PLT protocol data that corresponds to at least a second PLT;

generating, based on the updated PLT protocol data, a second SDR configured to communicate based on the second PLT;

establishing, by the second SDR, a third communication link with a second RAN that is different than the first RAN and that corresponds to the second PLT; and transmitting to the second RAN, via the third communication link, second field data that is received from the first IoT device via the first communication link.

10. The method of claim 9, wherein the generating the second SDR includes reconfiguring one or more components of the first SDR to convert the first SDR into the second SDR.

11. The method of claim 10, wherein the reconfiguring the one or more components of the first SDR includes reprogramming one or more field programmable gate arrays (FPGAs).

12. The method of claim 9, wherein the transmitting to the first RAN the first field data is performed, at least in part, through use of a first antenna, and wherein the transmitting to the second RAN the second field data is performed, at least in part, through use of a second antenna that is configured based on the second PLT.

13. The method of claim 9, further comprising:
receiving, via at least one of the first RAN or the second RAN, updated IoT protocol data that corresponds to at least a second IoT protocol;
generating, based on the updated IoT protocol data, a third SDR configured to communicate via the second IoT protocol; and
establishing, by the third SDR, a fourth communication link with a second IoT device that is configured based on the second IoT protocol.

14. The method of claim 9, further comprising:
monitoring location data associated with the first IoT device; and
determining that the first IoT device is approaching a boundary between the first RAN and the second RAN, wherein the generating the second SDR is at least partially in response to the determining.

15. The method of claim 9, further comprising:
executing a second IoT application associated with a second IoT device within a second virtual machine, wherein the second IoT application is encrypts third field data received from the second IoT device to the third field data being transmitted to the second RAN.

16. A hub device comprising:
one or more processors;
one or more antennas;
a memory storing instructions that are executable by the one or more processors to perform operations comprising:
establishing a first connection with an internet service provider (ISP) infrastructure;
receiving, at a first time via the ISP infrastructure, updated physical layer technology (PLT) protocol data that corresponds to a first PLT of a radio access network (RAN), wherein the hub device is incompatible with the first PLT at the first time;
configuring, based on the updated PLT protocol data, a software defined radio (SDR) to establish a second connection with the first PLT;
establishing, at a second time that is subsequent to the first time, the second connection with the first PLT of the RAN utilizing the SDR; and
executing an Internet-of-Things (IoT) application associated with an IoT device within at least one of a virtual container or a virtual machine, wherein the IoT application encrypts field data received from the IoT device to the field data being transmitted to the RAN.

17. The hub device of claim 16, wherein the configuring the SDR includes reprogramming one or more field programmable gate arrays (FPGAs).

18. The hub device of claim 16, wherein the ISP infrastructure is configured to deliver internet service to a local area network (LAN) via a physical connection to a modem that corresponds to the LAN, and wherein the physical connection includes at least one of a co-axial cable connection to the modem or an optical fiber connection to the modem.

19. The hub device of claim 16, wherein the one or more antennas comprise:
at least one IoT side antenna that is operable by at least one IoT side SDR configured based on a first IoT protocol; and
at least one RAN side antenna that is operable by at least one RAN side SDR configured based on a first physical layer technology (PLT) protocol.

20. The hub device of claim 19, wherein the operations further comprise:
receiving, via the at least one RAN side antenna at a third time, updated IoT protocol data corresponding to a second IoT protocol, wherein the at least one IoT side SDR is incompatible with the second IoT protocol at the third time; and
reconfiguring, based on the updated IoT protocol data, the at least one IoT side SDR for compatibility with the second IoT protocol.

* * * * *